United States Patent
Asakura et al.

(10) Patent No.: US 8,685,554 B2
(45) Date of Patent: Apr. 1, 2014

(54) BATTERY SYSTEM

(75) Inventors: Jun Asakura, Osaka (JP); Shunsuke Yasui, Osaka (JP); Hiroshi Takasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 16 days.

(21) Appl. No.: 13/512,165

(22) PCT Filed: Jul. 26, 2011

(86) PCT No.: PCT/JP2011/004213
§ 371 (c)(1),
(2), (4) Date: May 25, 2012

(87) PCT Pub. No.: WO2012/014449
PCT Pub. Date: Feb. 2, 2012

(65) Prior Publication Data
US 2012/0276423 A1    Nov. 1, 2012

(30) Foreign Application Priority Data
Jul. 30, 2010  (JP) .................................. 2010-171639

(51) Int. Cl.
H01M 10/52  (2006.01)
H01M 2/12  (2006.01)
H01M 10/48  (2006.01)
H01M 2/10  (2006.01)
H01M 2/00  (2006.01)

(52) U.S. Cl.
USPC ................... 429/53; 429/61; 429/62; 429/64; 429/58

(58) Field of Classification Search
None
See application file for complete search history.

(56) References Cited

U.S. PATENT DOCUMENTS 6,348,851 B1 *  2/2002  Wyser et al. ................... 337/411
2009/0192681 A1  7/2009  Hayashi et al.
(Continued)

FOREIGN PATENT DOCUMENTS

CN  102056757 A  5/2011
EP  2 289 720 A1  3/2011
(Continued)

OTHER PUBLICATIONS

International Search Report issued in International Patent Application No. PCT/JP2011/004213, mailed Oct. 25, 2011.
(Continued)

*Primary Examiner* — Barbara Gilliam
*Assistant Examiner* — Angela Martin
(74) *Attorney, Agent, or Firm* — McDermott Will & Emery LLP

(57) ABSTRACT

A battery system includes a battery module that has a plurality of batteries which are provided with release portions each for releasing internal gas when an internal pressure is increased, and an exhaust portion which is provided with an opening portion and guides gas released from the release portions to the opening portion, a non-resettable switch element which is provided at a position where the guided gas passes in a vicinity of the opening portion, and is changed from a first state preset as one of an opened state and a closed state into a second state as the other one of the opened state and the closed state when a preset reference temperature or higher is reached, and a high-temperature abnormality determination unit which determines that the battery module has an abnormality when the switch element is in the second state.

14 Claims, 7 Drawing Sheets

(56) References Cited

U.S. PATENT DOCUMENTS

| | | | |
|---|---|---|---|
| 2009/0202897 A1* | 8/2009 | Kim et al. | 429/120 |
| 2011/0059341 A1 | 3/2011 | Matsumoto et al. | |
| 2011/0212352 A1* | 9/2011 | Wood et al. | 429/99 |

FOREIGN PATENT DOCUMENTS

| | | | | |
|---|---|---|---|---|
| JP | 11-025938 A | | 1/1999 | |
| JP | 11-178202 | * | 7/1999 | H02H 7/18 |
| JP | 11-178202 A | | 7/1999 | |
| JP | 2002-075468 | * | 3/2002 | H01M 10/48 |
| JP | 2002-075468 A | | 3/2002 | |
| JP | 2007-099075 A | | 4/2007 | |
| JP | 2007-265658 A | | 10/2007 | |
| JP | 2009-303364 A | | 12/2009 | |
| WO | WO 2009/150965 A1 | | 12/2009 | |

OTHER PUBLICATIONS

Extended European Search Report issued in European Patent Application No. 11812051.8 dated Jul. 27, 2012.

* cited by examiner ity in mounting the battery pack in a limited space in the vehicle is improved, and the use of the general-purpose battery allows a significant reduction in cost due to a mass production effect. In addition, a relatively large number of batteries are connected in parallel and used, and hence, even when an abnormality occurs in some of the batteries, the supply of power can be continued for a certain time period. Consequently, it is possible to avoid a system failure.

BATTERY SYSTEM

RELATED APPLICATIONS

This application is the U.S. National Phase under 35 U.S.C. §371 of International Application No. PCT/JP2011/004213, filed on Jul. 26, 2011, which in turn claims the benefit of Japanese Application No. 2010-171639, filed on Jul. 30, 2010, the disclosures of which Applications are incorporated by reference herein.

TECHNICAL FIELD

The present invention relates to a battery system which detects release of gas from a battery.

BACKGROUND ART

Conventionally, there is commonly used a battery pack which obtains a required voltage and capacity by connecting a plurality of cells in series or parallel. In addition, in recent years, in terms of reductions in consumption of fossil fuel and emission of $CO_2$, as a power supply for driving a motor of an electric car or a hybrid car, there are growing expectations for the battery pack.

Such battery pack for the electric vehicle requires a voltage and a capacity larger than those for the battery pack for domestic use. Accordingly, the battery pack has been constituted mainly by connecting a large number of dedicated large-capacity cells in series. However, recently, there is started the adoption of a technology capable of coping with various uses through modularization by connecting a plurality of general-purpose batteries used for domestic use in series or parallel.

The modularization technology has an advantage that flexibility in mounting the battery pack in a limited space in the vehicle is improved, and the use of the general-purpose battery allows a significant reduction in cost due to a mass production effect. In addition, a relatively large number of batteries are connected in parallel and used, and hence, even when an abnormality occurs in some of the batteries, the supply of power can be continued for a certain time period. Consequently, it is possible to avoid a system failure.

However, in the case where the supply of power is continued even when the abnormality occurs in some of the batteries, it becomes important to secure safety of not only the individual batteries but also the entire battery module as the assembly of the individual batteries. That is, when an excessive current flows in the battery due to, e.g., an internal short-circuit, unusual heat generation occurs, an internal pressure is increased, and high-temperature gas gushes out so that the surrounding area is thereby adversely affected and the battery is degraded in a chain reaction manner.

There is proposed a method for exhausting smoke to the outside of a cabin by automatically starting an air conditioner or opening a window in advance to communicate the cabin with the outside of a vehicle when a vehicle collision or the like is anticipated such that, even when an impact is applied to a battery pack and the smoke (gas) generated from an internal lithium ion battery enters into the cabin, the smoke can be exhausted to the outside of the vehicle (see, e.g., Patent Document 1).

In addition, there is proposed a method for monitoring a state when gas is exhausted from a battery by using a gas sensor and a gas temperature sensor provided inside a gas exhaust path (see, e.g., Patent Document 2).

In the conventional art described in Patent Document 1, a collision detection sensor or a radar device provided in the vehicle predicts the vehicle collision, and the air conditioner is started or the window is opened. Consequently, even when the vehicle collision does not actually happen and the impact is not applied to the vehicle, there are cases where the air conditioner is started or the window is opened. Such operation may be an operation against the intention of a user and may give an uncomfortable feeling to the the user. There is a possibility that the smoke occurs depending on the state of the lithium ion battery even when the impact is not applied to the battery pack, and the conventional art of Patent Document 1 has had a problem that the abnormality of the battery cannot be detected in a case where the smoke occurs due to causes other than the impact.

In the conventional art described in Patent Document 2, when the lithium ion battery generates the gas, it is possible to detect the generation of the gas by using the gas sensor and the gas temperature sensor and report the occurrence of the abnormality to the user driving the vehicle by, e.g., turning on an alarm light provided in an instrument panel of the vehicle. However, in many cases, the generation of the gas from the battery continues for a relatively short time period, e.g., several seconds. Accordingly, even when the gas is generated from the battery, the alarm light is turned on only for several seconds, and hence the user may overlook the turning-on of the alarm light. Further, in a case where the abnormality occurs in the battery and the gas is generated when the vehicle is not driven, especially when the power supply of the vehicle is turned off, a control circuit for detecting the gas itself is not operated, and hence the generation of the gas cannot be detected. Thereafter, when the power supply of the vehicle is turned on, the generation of the gas is already stopped, and hence there has been a problem that the abnormality of the battery cannot be detected after all.

Patent Document 1: Japanese Patent Application Laid-open No. 2007-099075

Patent Document 2: WO 2009/150965

SUMMARY OF THE INVENTION

An object of the present invention is to provide a battery system capable of improving reliability in detection of release of gas from a battery.

A battery system according to one aspect of the present invention includes a battery module that has a plurality of batteries which are provided with release portions each for releasing internal gas when an internal pressure is increased, and a discharge portion which is provided with an opening portion and guides gas released from the release portions to the opening portion, a non-resettable switch element which is provided at a position where the guided gas passes in a vicinity of the opening portion, and is changed from a first state preset as one of an opened state and a closed state into a second state as the other one of the opened state and the closed state when a preset reference temperature or higher is reached, and a high-temperature abnormality determination unit which determines that the battery module has an abnormality when the switch element is in the second state.

According to the present invention, it is possible to improve reliability in the detection of release of the gas from the battery.

DESCRIPTION OF EMBODIMENTS

Figure 1:
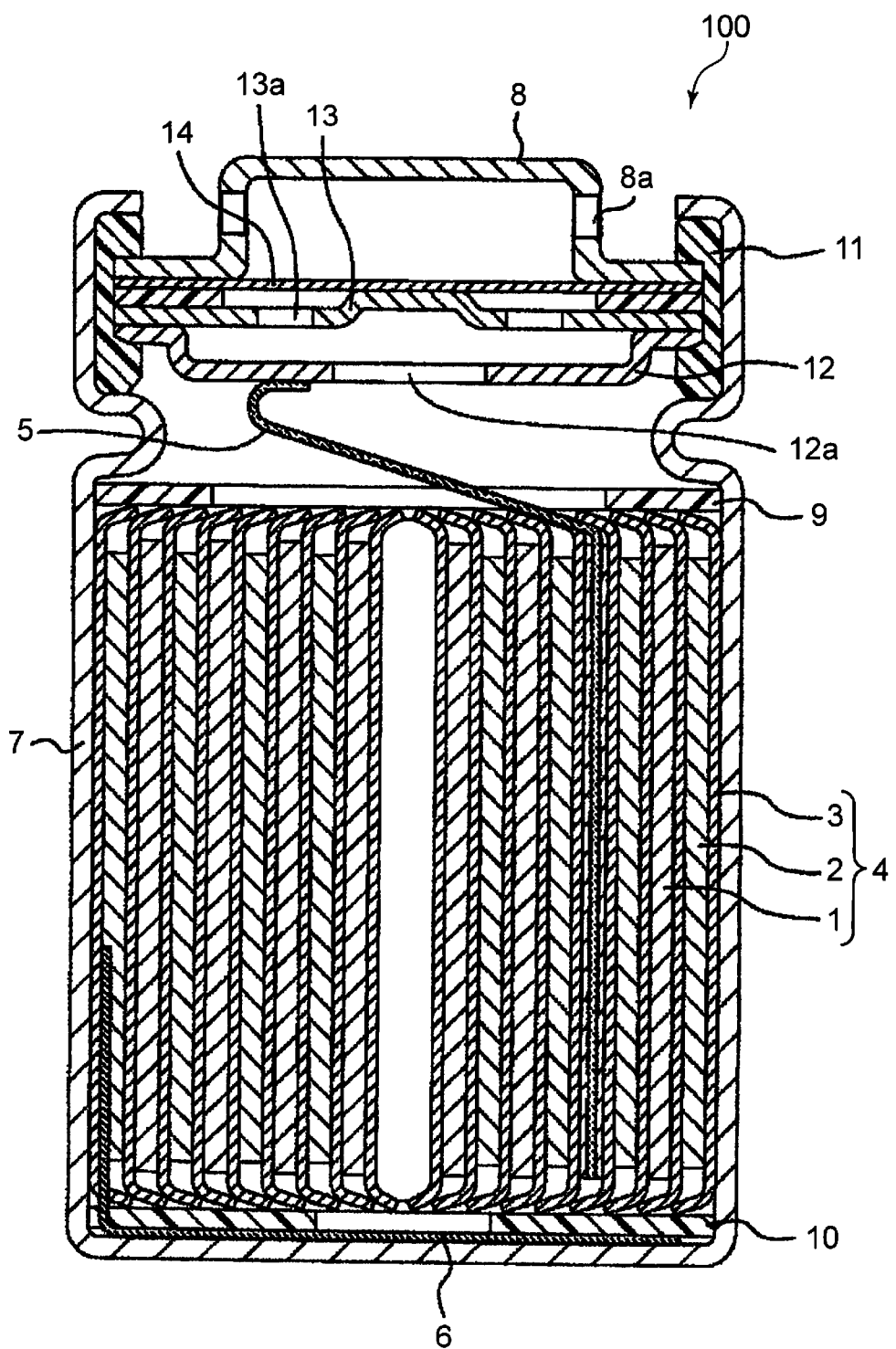
FIG. 1 is a cross-sectional view schematically showing a configuration of a battery used in a battery system in an embodiment of the present invention.

A detailed description is given hereinbelow of an embodiment of the present invention on the basis of the drawings. Note that, in the individual drawings, components designated with the same reference numerals are the same components, and the description thereof will be therefore omitted.

FIG. 1 is a cross-sectional view schematically showing a configuration of a cell 100 used in a battery system 200 in the embodiment of the present invention. Note that a battery used in the battery system 200 may also be a battery which can be used singly as a power supply for a portable electronic device such as a note-type personal computer or the like (hereinafter, the battery used in the battery system 200 is referred to as a "cell".) In this case, a high-performance general-purpose battery can be used as the cell for the battery system 200, and hence it is possible to more easily achieve an increase in the performance of the battery system 200 and a reduction in the cost thereof.

As the cell 100 used in the battery system 200, for example, a lithium ion secondary battery as a cylindrical non-aqueous electrolyte secondary battery shown in FIG. 1 can be used. The cell 100 has a normal configuration as the lithium ion secondary battery. Note that the cell 100 is not limited to the lithium ion secondary battery, and various secondary batteries or primary batteries can be used. The cell 100 has a safety mechanism which releases gas out of the cell when a pressure in the cell is increased due to the occurrence of an internal short-circuit or the like. Hereinbelow, the specific configuration of the cell 100 is described with reference to FIG. 1.

As shown in FIG. 1, an electrode group 4 in which a separator 3 is disposed between a positive electrode 1 and a negative electrode 2 in a wound state is accommodated in a battery case 7 together with a non-aqueous electrolyte. Insulating plates 9 and 10 are provided above and below the electrode group 4. The positive electrode 1 is bonded to a filter 12 via a positive electrode lead 5, while the negative electrode 2 is bonded to the bottom portion of the battery case 7 which also functions as a negative electrode terminal via a negative electrode lead 6.

The filter 12 is connected to an inner cap 13, and the protruded portion of the inner cap 13 is bonded to a metal valve plate 14. In addition, the valve plate 14 is connected to a terminal strip 8 which also functions as a positive electrode terminal. The terminal strip 8, the valve plate 14, the inner cap 13, and the filter 12, which are put together by a gasket 11 surrounding them, seal the opening portion of the battery case 7.

When the internal short-circuit or the like occurs in the cell 100 and the pressure in the cell 100 is increased, the valve plate 14 is expanded toward the terminal strip 8. When the valve plate 14 is expanded and the inner cap 13 is detached from the valve plate 14, a current path from the positive electrode 1 to the terminal strip 8 is interrupted. When the pressure in the cell 100 is further increased, the valve plate 14 is ruptured. With the rupture, gas generated in the cell 100 is released to the outside via a through hole 12a of the filter 12, a through hole 13a of the inner cap 13, a split in the valve plate 14, and a release portion 8a of the terminal strip 8. With this, the gas is released to the side of the terminal strip 8 of the cell 100.

Note that the safety mechanism for releasing the gas generated in the cell 100 to the outside is not limited to the configuration shown in FIG. 1, and the safety mechanism may have other configurations.

Figure 2:
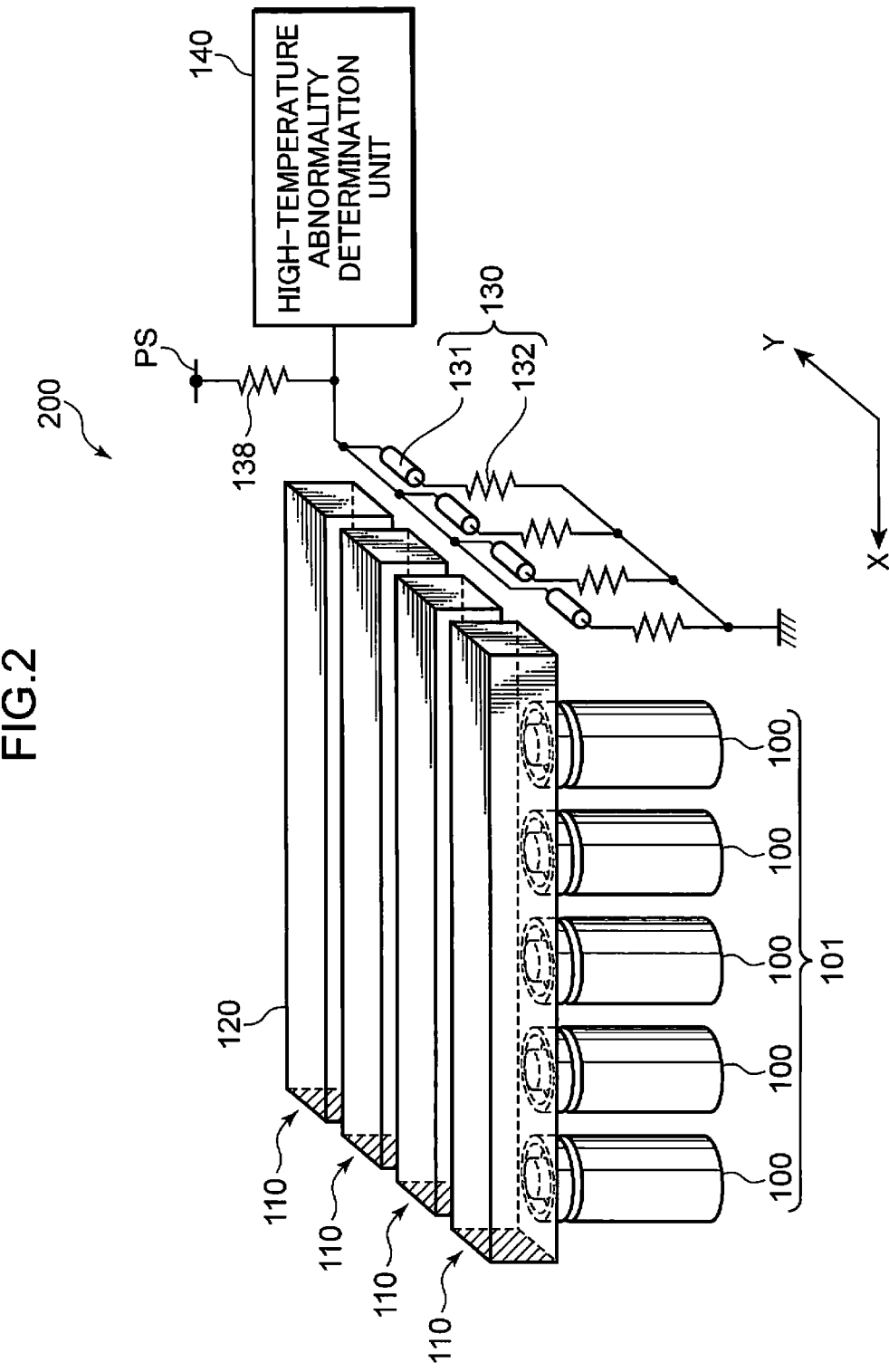
FIG. 2 is a perspective view schematically showing a configuration of the battery system in the embodiment of the present invention.
Figure 3:
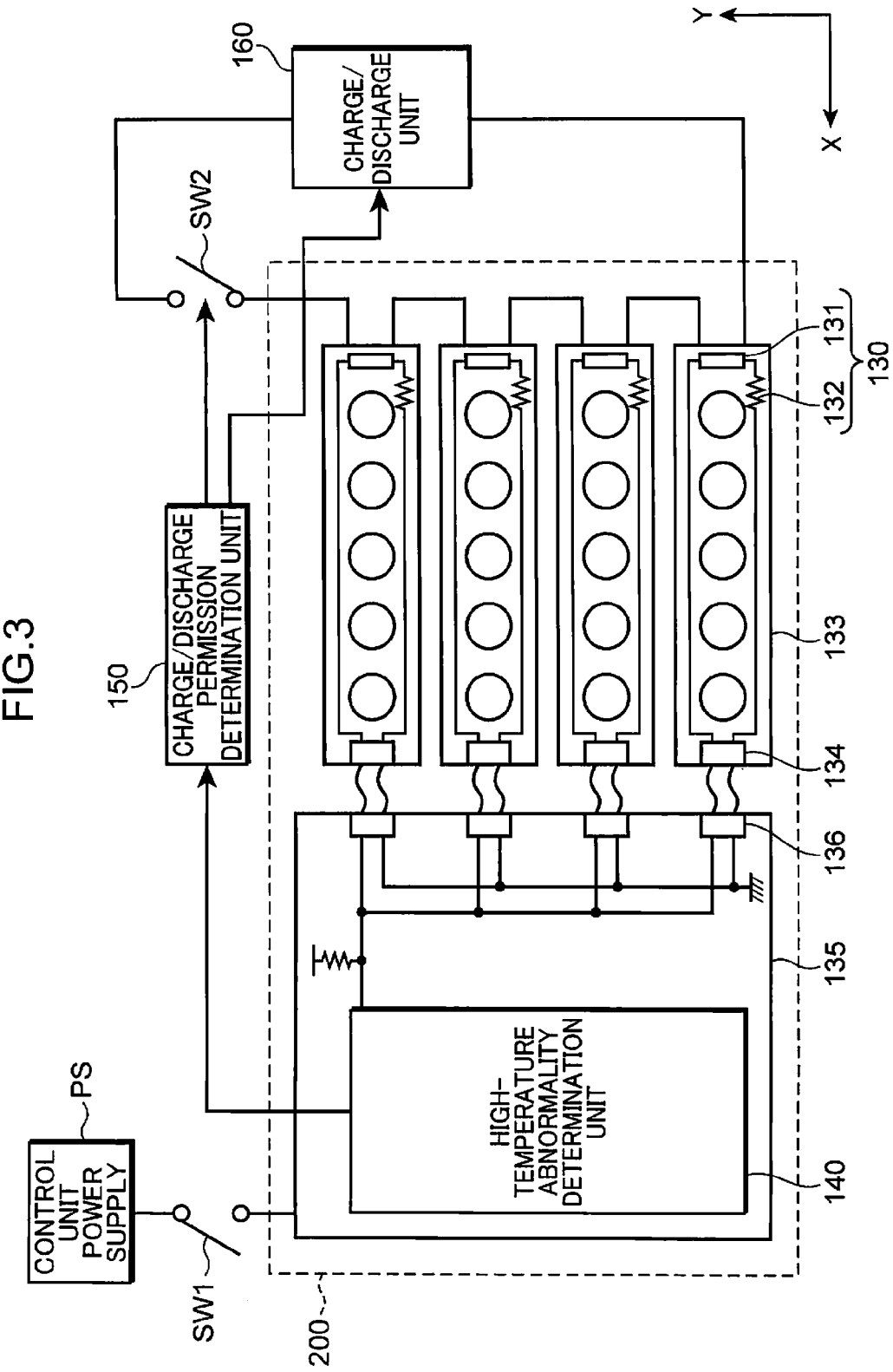
FIG. 3 is a top view schematically showing the configuration of the battery system in the embodiment of the present invention.

FIG. 2 is a perspective view conceptually showing the configuration of the battery system 200 in the present embodiment. In addition, FIG. 3 is a top view conceptually showing the configuration of the battery system 200 in the present embodiment. In FIG. 2, a left direction on a paper sheet with the drawing corresponds to an X direction, while an obliquely upper right direction thereon corresponds to a Y direction. In FIG. 3, a left direction on a paper sheet with the drawing corresponds to an X direction, while an upward direction thereon corresponds to a Y direction.

As shown in FIGS. 2 and 3, the battery system 200 includes, e.g., a high-temperature abnormality detection unit 130, a high-temperature abnormality determination unit 140, and four sets of battery modules 110 arranged in the Y direction. To the outside of the battery system 200, a control unit power supply PS, a charge/discharge permission determination unit 150, and a charge/discharge unit 160 are connected.

The control unit power supply PS is a power supply circuit which outputs a voltage Vps for causing the high-temperature abnormality detection unit 130 and the high-temperature abnormality determination unit 140 to operate. The control unit power supply PS is connected to the high-temperature abnormality detection unit 130 via, e.g., a power supply switch SW1.

The charge/discharge unit 160 includes a charge circuit for charging the battery system 200, and a discharge circuit for causing the battery system 200 to discharge power and supplying the power to a load. The charge/discharge unit 160 is connected to a plurality of the battery modules 110 via a protective switch SW 2.

The charge/discharge permission determination unit 150 is a control circuit for controlling the operation of the charge/discharge unit 160. The charge/discharge permission determination unit 150 may cause the charge/discharge unit 160 to perform or suspend charge/discharge by outputting a control signal to the charge/discharge unit 160, or may prohibit the charge/discharge by the charge/discharge unit 160 by turning OFF (opening) the protective switch SW2.

The battery module 110 includes a battery unit 101 and an exhaust path 120 (a passage space). The battery unit 101 includes five cells 100 arranged in the X direction. The five cells 100 are connected in parallel.

The high-temperature abnormality determination unit 140 includes, e.g., a CPU (Central Processing Unit), a nonvolatile ROM (Read Only Memory), a volatile RAM (Random Access Memory), an analog/digital converter, and their peripheral circuits.

On the terminal strip 8 side of the cell 100, i.e., on the release portion 8a side, the exhaust path 120 extending in the X direction is provided. As shown in FIG. 2, the high-temperature abnormality detection unit 130 is disposed at the exhaust outlet of each exhaust path 120, and the high-temperature abnormality detection unit 130 is connected to the high-temperature abnormality determination unit 140. The exhaust outlets of the individual exhaust paths 120 are integrated into, e.g., one exhaust path which is not shown, and the gas is exhausted to the outside of the vehicle. Each exhaust path 120 may be formed of, e.g., a duct-like member. In addition, the exhaust path 120 may also be formed by utilizing a gap between individual members constituting the battery module 110.

Four high-temperature abnormality detection units 130 are provided so as to correspond to the individual battery modules 110. The high-temperature abnormality detection unit 130 is formed of a temperature fuse 131 and a resistor 132. The temperature fuse 131 is blown at 100° C. serving as a reference temperature. The high-temperature abnormality detection unit 130 is provided on a printed-circuit board 133. The high-temperature abnormality detection unit 130 is connected to a connector 136 on a printed-circuit board 135 having the high-temperature abnormality determination unit 140 via a connector 134. When the cell 100 releases the gas generated due to the internal short-circuit or the like, the temperature in the vicinity of the exhaust outlet of the exhaust path 120 where the high-temperature abnormality detection unit 130 is disposed rises to several hundred degrees for several seconds. Consequently, the temperature fuse 131 is blown due to the temperature of the gas. Hereinbelow, an abnormality in which the cell 100 generates the gas is referred to as a high-temperature gas abnormality.

The temperature fuse 131 is a non-resettable switch element which is never brought back into a closed state once the switch element is blown and brought into an opened state. In the case of the temperature fuse 131, the closed state corresponds to a first state, while the opened state corresponds to a second state.

Figure 4:
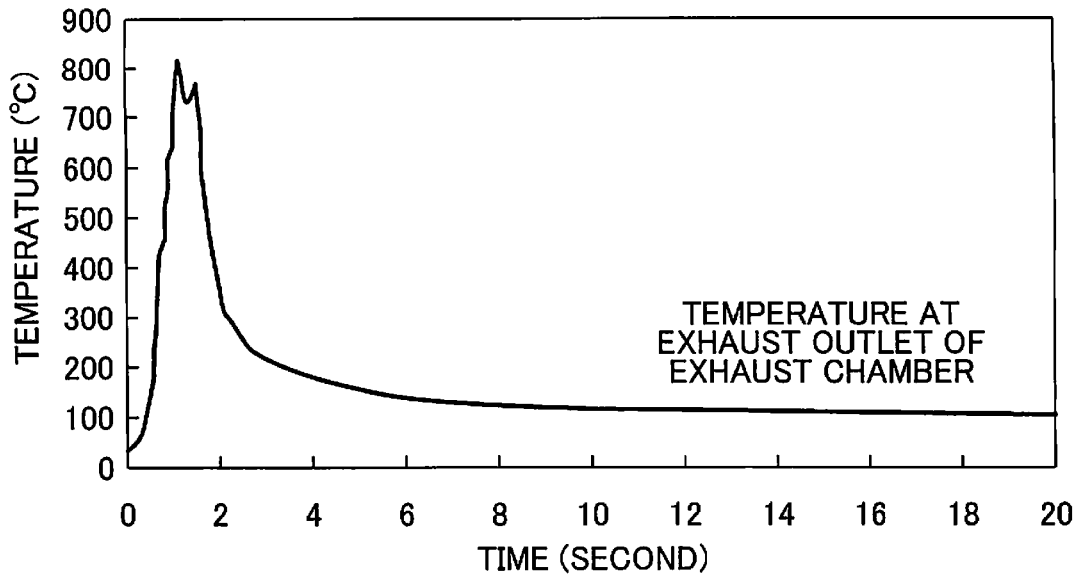
FIG. 4 is an explanatory view showing a temperature change at a exhaust outlet of a exhaust path in the embodiment of the present invention.

A temperature change at the exhaust outlet of the exhaust path 120 is described in detail. FIG. 4 is a view showing the temperature change at the exhaust outlet in the present embodiment. As shown in FIG. 4, the temperature at the exhaust outlet of the exhaust path 120 is substantially equal to ambient temperature in a state where the high-temperature gas abnormality does not occur in the cell 100, i.e., at a time of 0 second. When the cell 100 releases the gas due to the internal short-circuit or the like, the temperature rises up to 800° C. in about two seconds, and thereafter the temperature lowers to 200° C. or less in one second. That is, the temperature fuse 131 is maintained at a temperature of several hundred degrees for about three to four seconds, and hence the temperature fuse 131 is blown.

Figure 5:
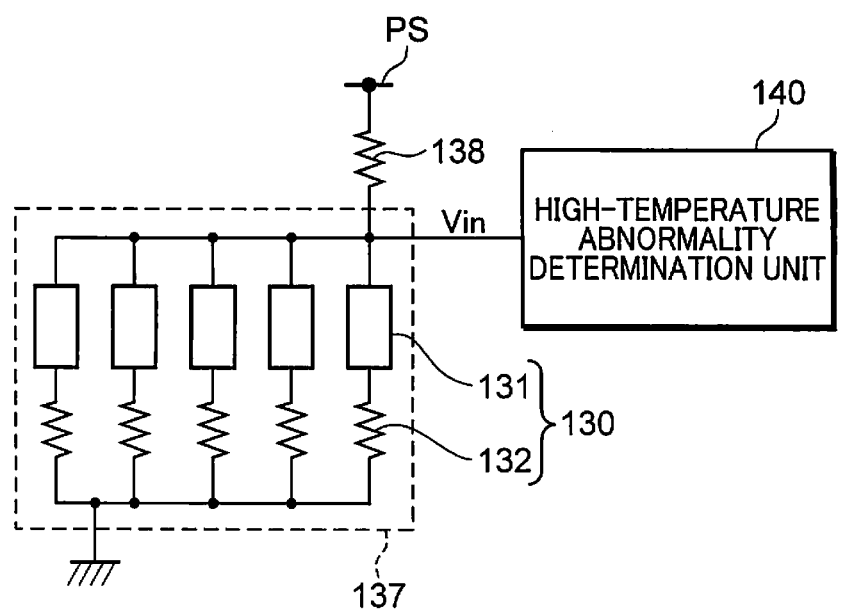
FIG. 5 is a circuit diagram showing a configuration of a high-temperature abnormality detection unit and a high-temperature abnormality determination unit in the embodiment of the present invention.

A description is given of the connection between the high-temperature abnormality detection unit 130 (the temperature fuse 131, the resistor 132) and the high-temperature abnormality determination unit 140. FIG. 5 shows an example of the configuration of the high-temperature abnormality detection unit 130 and the high-temperature abnormality determination unit 140 in the present embodiment. FIG. 5 shows an example in which five high-temperature abnormality detection units 130 are provided so as to correspond to five battery modules 110. As shown in FIG. 5, the high-temperature abnormality detection unit 130 provided in each exhaust path 120 is constituted by connecting the temperature fuse 131 and the resistor 132 in series. A parallel circuit 137 is constituted by connecting the high-temperature abnormality detection units 130 in parallel.

One end of the parallel circuit 137 is connected to the control unit power supply PS via a resistor 138, and the other end of the parallel circuit 137 is connected to the ground. The connection point between the resistor 138 and the parallel circuit 137 is connected to the high-temperature abnormality determination unit 140. With the arrangement, the output voltage Vps of the control unit power supply PS is divided by the resistor 138 and the parallel circuit 137, and the divided voltage Vin is detected by the high-temperature abnormality determination unit 140.

The voltage Vin rises when the resistance value of the parallel circuit 137 increases, and the voltage Vin lowers when the resistance value of the parallel circuit 137 decreases. Accordingly, the voltage Vin shows the resistance value of the parallel circuit 137.

When all of the cells 100 are normal and no blown temperature fuse 131 is present, the resistors 132 of all (five) of the high-temperature abnormality detection units 130 are connected in parallel. For example, the value of the voltage Vin obtained in this state is preset as a determination value Vth, and is stored in, e.g., the ROM. That is, the determination value Vth shows the resistance value of the parallel circuit 137 when all of the battery modules 110 are normal.

On the other hand, when the gas is released from any of the cells 100 in any of the battery modules 110 and the temperature fuse 131 is blown, i.e., when the number of resistors 132 connected in parallel becomes four or less, the voltage Vin exceeds the determination value Vth (Vin>Vth).

When the voltage Vin is not more than the determination value Vth, the high-temperature abnormality determination unit 140 determines that no high-temperature gas abnormality occurs in all of the battery modules 110. On the other hand, when the voltage Vin exceeds the determination value Vth, the high-temperature abnormality determination unit 140 determines that the high-temperature gas abnormality has occurred in any of the battery modules 110.

Figure 6:
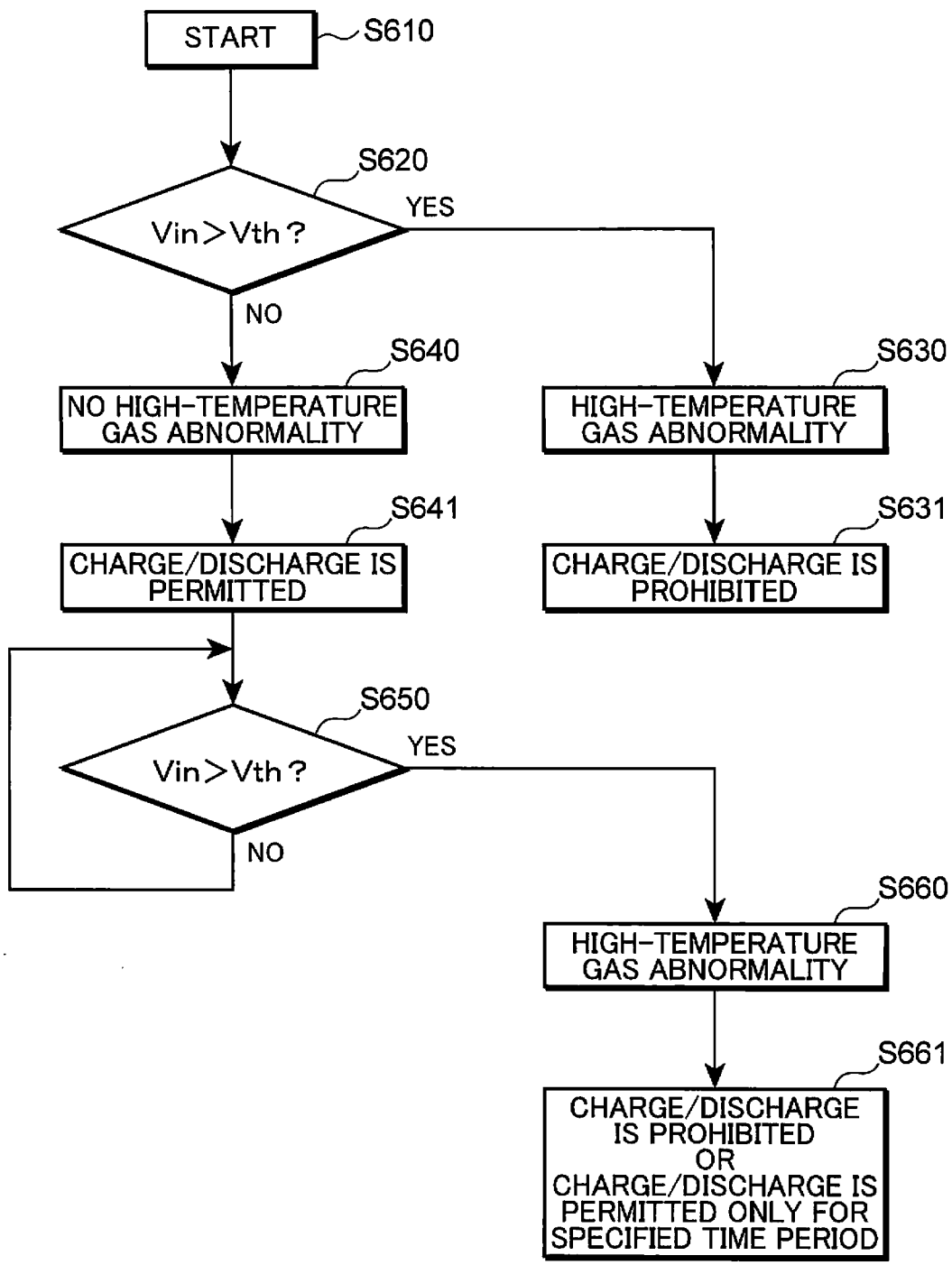
FIG. 6 is a flowchart showing a high-temperature abnormality determination process of the battery system in the embodiment of the present invention.

FIG. 6 is a flowchart showing an example of a high-temperature abnormality determination operation of the battery system in the present embodiment.

First, the battery system 200 is started. For example, in a case where the battery system 200 is mounted on an electric vehicle, when the electric vehicle is started, the battery system 200 is started (Step S610). Next, the high-temperature abnormality determination unit 140 determines whether or not the input voltage Vin is higher than the determination value Vth (Step S620).

In Step S620, when the input voltage Vin is higher than the determination value Vth, the high-temperature abnormality determination unit 140 determines that the high-temperature gas abnormality of the cell 100 has occurred to generate the high-temperature gas before the start of the battery system 200 in Step S610 (Step S630). Subsequently, the high-temperature abnormality determination unit 140 transmits information indicative of the occurrence of the high-temperature gas abnormality to the charge/discharge permission determination unit 150. In response to the information, the charge/discharge permission determination unit 150 prohibits the charge/discharge of the battery system 200 by the charge/discharge unit 160 (Step S631).

As described above, since the temperature fuse 131 is the non-resettable switching element, irrespective of the operation of the system of the electric vehicle or the like, or the presence or absence of the power supply by the control unit power supply PS, once the high-temperature gas abnormality occurs to blow the temperature fuse 131, the temperature fuse 131 is retained in an OFF (opened) state. As a result, for example, even when the high-temperature gas abnormality has occurred in the battery system 200 during a time period when the system of the electric vehicle or the like is suspended (power supply is OFF), it becomes possible to detect the high-temperature gas abnormality having occurred during the suspension of the system after the system of the electric vehicle or the like is started. Consequently, it is possible to improve the reliability in the detection of release of the gas from the battery.

In Step S620, when the input voltage Vin is not more than the determination value Vth, the high-temperature abnormality determination unit 140 determines that the high-temperature gas abnormality has not occur in the cell 100 (Step S640). Subsequently, the high-temperature abnormality determination unit 140 transmits information indicative of the absence of the high-temperature gas abnormality to the charge/discharge permission determination unit 150. In response to the information, the charge/discharge permission determination unit 150 permits the charge/discharge of the battery system 200 by the charge/discharge unit 160 (Step S641).

Then, during the operation of the battery system 200, the high-temperature abnormality determination unit 140 constantly determines whether or not the input voltage Vin is higher than the determination value Vth (Step S650).

In Step S650, when the input voltage Vin is higher than the determination value Vth, the high-temperature abnormality determination unit 140 determines that the abnormality has occurred in the cell 100 during the operation of the battery system 200 to generate the high-temperature gas (Step S660). Subsequently, the charge/discharge permission determination unit 150, which has obtained the information indicative of the occurrence of the high-temperature gas abnormality from the high-temperature abnormality determination unit 140, prohibits the charge/discharge of the battery system 200 by the charge/discharge unit 160 or permits the charge/discharge of the battery system 200 by the charge/discharge unit 160 only for a specified time period (Step S661).

According to such configuration, the temperature fuses 131 of the high-temperature abnormality detection units 130 are disposed at the exhaust outlets of the exhaust paths of the gas, and the number of connected resistors 132 of the high-temperature abnormality detection units 130 is changed by the blowing of the temperature fuse 131. Based on that, it is possible to determine that the abnormality occurs in the lithium ion battery, and further determine that the abnormality has occurred in the lithium ion battery before the start thereof.

Note that, although the present embodiment has shown the example where the temperature fuse is used as the non-resettable switch element, the switch element is not limited to the temperature fuse. The switch element may be any non-resettable switch element which operates at a temperature of not less than specific degrees, and may also be, e.g., a non-resettable switch using bimetal.

The non-resettable switch element using the bimetal can be constituted by using a bimetal switch which is changed into an OFF (opened) state from an ON (closed) state when a reference temperature or higher is reached, e.g., a temperature of 100° C. or higher is reached, and a latch mechanism which maintains the state of a contact in the OFF state once the contact of the bimetal switch is turned OFF. In this case, the closed state corresponds to the first state, while the opened state corresponds to the second state.

In addition, instead of the temperature fuse 131, as the non-resettable switch element, there may be used a switch element which is changed into the ON (closed) state from the OFF (opened) state when a reference temperature or higher is reached. Such switch element can be constituted by using, e.g., a bimetal switch which is changed into the ON (closed) state from the OFF (opened) state when the reference temperature or higher is reached and a latch mechanism which maintains the state of a contact in the ON state once the contact of the bimetal switch is turned ON. In this case, the opened state corresponds to the first state, while the closed state corresponds to the second state.

When the switch element which is changed into the ON (closed) state from the OFF (opened) state when the reference temperature or higher is reached is used as the non-resettable switch element, as the number of switch elements which are turned ON is increased, i.e., the number of battery modules 110 each in which the high-temperature gas abnormality has occurred is increased, the resistance value of the parallel circuit 137 or a series circuit 139 is reduced.

Consequently, when such switch element is used, in each of Step S620 and Step S650 shown in FIG. 6, it may be determined whether or not "Vin<Vth" is satisfied.

Note that the present embodiment has shown the example where the resistance values of the resistors 132 of the four (or five) high-temperature abnormality detection units 130 corresponding to the individual battery modules 110 are equal to each other. However, the resistance values of the individual resistors 132 may also be set to different values. For example, when five high-temperature abnormality detection units 130 corresponding to five battery modules 110 are connected in parallel, the resistance values of the resistors 132 of the individual high-temperature abnormality detection units 130 may also be set to, e.g., 1 kΩ (ohm), 2 kΩ (ohm), 4 kΩ (ohm), 8 kΩ (ohm), and 16 kΩ (ohm).

Specifically, for example, when A represents a constant greater than 0, B represents a common ratio greater than 0 except 1, and n represents a positive integer, a value of each term of a geometrical progression in which the n-th term is represented by the following expression (1) may be set as the resistance value of each resistor 132:

$$A \times B^n \qquad (1).$$

Note that the following expression (2) may also be used in place of the expression (1):

$$A \times B^{(n-1)} \qquad (2).$$

Subsequently, each battery module 110 is assigned with an identification number, and the resistance value of the resistor 132 corresponding to the battery module 110 having the identification number n is set to a value given by the above expression (1). With this, the resistance value of the resistor 132 separated from the parallel circuit 137 differs in accordance with which battery module 110 has the high-temperature gas abnormality. As a result, the resistance value of the parallel circuit 137 takes a different value according to the battery module 110 having the high-temperature gas abnormality. Consequently, the voltage Vin takes a different voltage value according to the battery module 110 having the high-temperature gas abnormality.

Then, for example, a LUT (Lookup Table) which associates the resistance value of the parallel circuit 137 in the case where each battery module 110 has the high-temperature gas abnormality with the identification number of each battery module 110 is pre-stored in the ROM. The high-temperature abnormality determination unit 140 may identify the battery module 110 having the identification number associated with the detected voltage Vin as the battery module 110 having the high-temperature gas abnormality by using the LUT.

Figure 7:
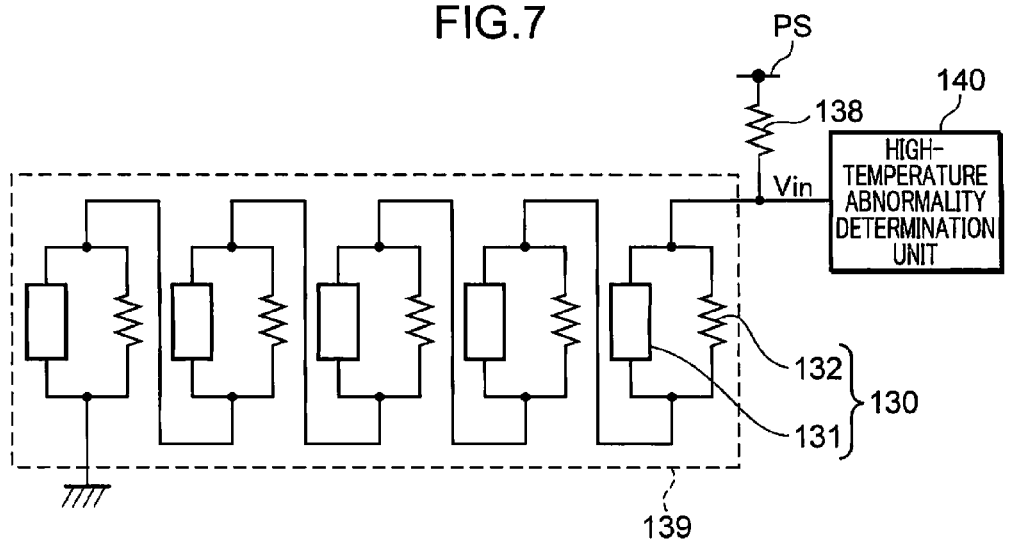
FIG. 7 is a circuit diagram showing another configuration of the high-temperature abnormality detection unit and the high-temperature abnormality determination unit in the embodiment of the present invention.

Note that the present embodiment has shown the example where each high-temperature abnormality detection unit 130 is constituted by connecting the temperature fuse 131 and the resistor 132 in series, and the individual high-temperature abnormality detection units 130 are connected in parallel. However, for example, as shown in FIG. 7, each high-temperature abnormality detection unit 130 may be constituted as a parallel circuit of the temperature fuse 131 and the resistor 132. Subsequently, the series circuit 139 may be constituted by connecting a plurality of the high-temperature abnormality detection units 130 in series.

In this case, in the high-temperature abnormality detection unit 130, more current flows to the temperature fuse 131 having the low resistance value than to the resistor 132 having the high resistance value. The resistance value of the temperature fuse 131 which is not blown is substantially 0 Ω (ohm). Consequently, the combined resistance of the series circuit 139 when the high-temperature gas abnormality of the cell 100 does not occur is substantially 0 kΩ (ohm).

When the high-temperature gas abnormality occurs, as the result of blowing of the temperature fuse 131, the combined resistance of the series circuit 139 is increased. Further, the resistance values of the individual resistors 132 of the series circuit 139 may be set to different values. For example, when five high-temperature abnormality detection units 130 corresponding to five battery modules 110 are connected in series, the resistance values of the resistors 132 of the individual high-temperature abnormality detection units 130 may be set to, e.g., 1 kΩ (ohm), 2 kΩ (ohm), 4 kΩ (ohm), 8 kΩ (ohm), and 16 kΩ (ohm).

Specifically, for example, the value of each term of the geometric progression represented by the above expression (1) or (2) may be set as the resistance value of each resistor 132 of the series circuit 139.

Figure 8:
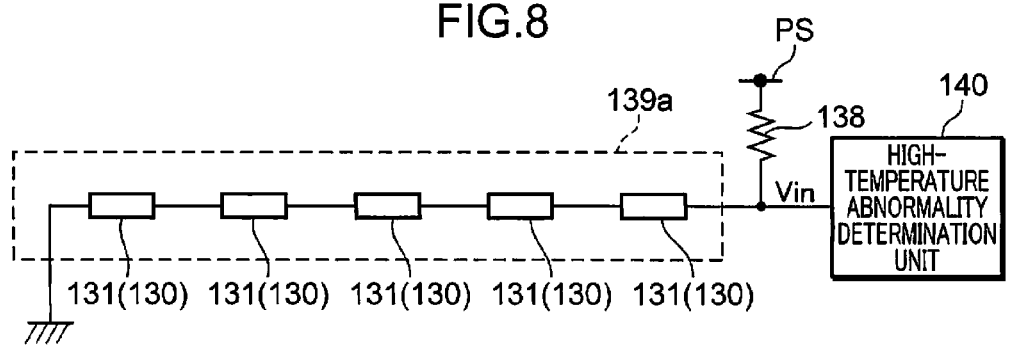
FIG. 8 is a circuit diagram showing a modification of the high-temperature abnormality detection unit shown in FIG. 7.

Note that a series circuit 139a shown in FIG. 8 may be used in place of the series circuit 139 shown in FIG. 7. The series circuit 139a is constituted by connecting a plurality (five) of the temperature fuses 131 in series. In this case, each high-temperature abnormality detection unit 130 includes only the temperature fuse 131.

The resistance value of the series circuit 139a shown in FIG. 8 is substantially 0 Ω (ohm) in the normal state. As a result, the voltage Vin is substantially 0 V, and is at a low level. Consequently, Vin<Vth (NO in each of Step S620 and Step S650) is satisfied, and it can be determined that there is no high-temperature gas abnormality.

On the other hand, when any of the temperature fuses 131 is blown, i.e., when any of a plurality of the battery modules 110 has the high-temperature gas abnormality, the resistance value of the series circuit 139a is substantially infinite. As a result, the voltage Vin is substantially equal to the voltage Vps, and is at a high level. Consequently, Vin>Vth (YES in each of Step S620 and Step S650) is satisfied, and it can be determined that the high-temperature gas abnormality has occurred.

Thus, according to the series circuit 139a shown in FIG. 8, it is possible to determine the presence or absence of occurrence of the high-temperature gas abnormality with the configuration simpler than that of the series circuit 139 shown in FIG. 7.

Figure 9:
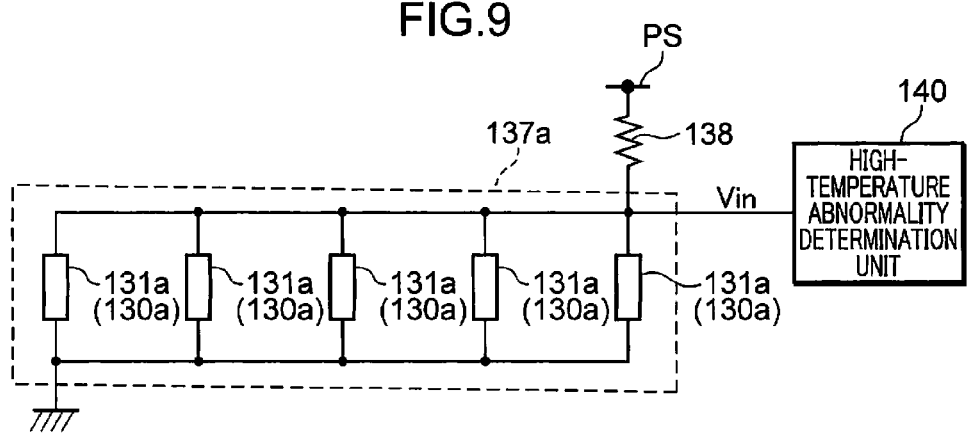
FIG. 9 is a circuit diagram showing a modification of the high-temperature abnormality detection unit shown in FIG. 5.

In addition, instead of the parallel circuit 137 shown in FIG. 5, a parallel circuit 137a shown in FIG. 9 may be used. The parallel circuit 137a is constituted by connecting a plurality (five) of switch elements 131a in parallel. In this case, each high-temperature abnormality detection unit 130a includes only the switch element 131a. The switch element 131a is a switch element which is changed into the ON (closed) state from the OFF (opened) state when a reference temperature or higher is reached.

Then, it is determined whether or not "Vin<Vth" is satisfied in each of Step S620 and Step S650 shown in FIG. 6.

The resistance value of the parallel circuit 137a shown in FIG. 9 is substantially infinite in the normal state. As a result, the voltage Vin is substantially equal to the voltage Vps, and is at the high level. Consequently, Vin>Vth (NO in each of Step S620 and Step S650) is satisfied, and it can be determined that there is no high-temperature gas abnormality.

On the other hand, when any of the switch elements 131a is turned ON, i.e., when any of a plurality of the battery modules 110 has the high-temperature gas abnormality, the resistance value of the parallel circuit 137a becomes substantially 0 Ω (ohm). As a result, the voltage Vin becomes substantially 0 V, and is at the low level. Consequently, Vin<Vth (YES in each of Step S620 and Step S650) is satisfied, and it can be determined that the high-temperature gas abnormality has occurred.

Thus, according to the parallel circuit 137a shown in FIG. 9, it is possible to determine the presence or absence of occurrence of the high-temperature gas abnormality with the configuration simpler than that of the parallel circuit 137 shown in FIG. 5.

Note that, although the example where the temperature abnormality detection unit is disposed in each block has been shown, the temperature abnormality detection unit may also be disposed at a position where the exhaust outlets of a plurality of the blocks are integrated in one path. In this case, the high-temperature gas becomes liable to cool due to an increase in the length of the exhaust path, and hence it is desirable to dispose the temperature abnormality detection unit at a position optimum for the blowing of the temperature fuse.

Figure 10:
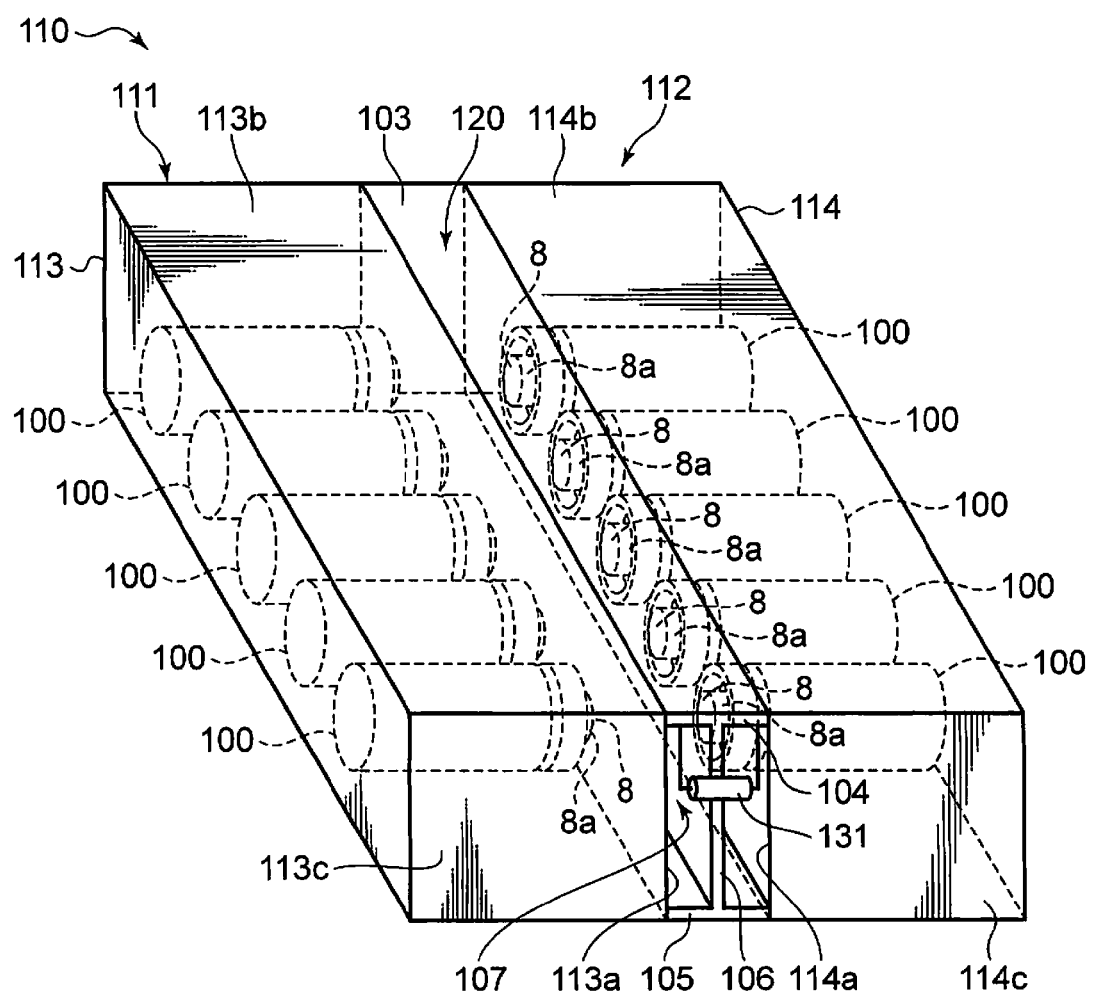
FIG. 10 is a perspective view specifically showing an example of a mechanical structure of a battery module shown in FIG. 2.

FIG. 10 is a perspective view specifically showing an example of the mechanical structure of the battery module 110 shown in FIG. 2. The battery module 110 shown in FIG. 10 includes a first block 111 and a second block 112.

The first block 111 is constituted by accommodating, e.g., five cells 100 in a substantially rectangular parallelepiped box-like casing 113. The second block 112 is constituted by accommodating, e.g., five cells 100 in a substantially rectangular parallelepiped box-like casing 114. The first block 111 and the second block 112 are disposed to face each other such that a side wall surface 113a of the first block 111 and a side wall surface 114a of the second block 112 face each other at a predetermined interval.

With reference to the battery module 110, an attitude thereof when it is used is set as a reference attitude. As the reference attitude, an attitude in which an upper wall surface 113b of the first block 111 and an upper wall surface 114b of the second block 112 are faced upward, and a lower wall surface 113c of the first block 111 and a lower wall surface 114c of the second block 112 are faced downward is set.

An upper lid 104 is provided so as to be placed astride the upper wall surface 113b and the upper wall surface 114b. A lower lid 105 is provided so as to be placed astride the lower wall surface 113c and the lower wall surface 114c. Further, at one end portions of the upper lid 104 and the lower lid 105, a side lid 103 is provided so as to be placed astride the upper lid 104 and the lower lid 105.

With this arrangement, there is formed the exhaust path 120 as the passage space which is surrounded in five directions by the side lid 103, the upper lid 104, the lower lid 105, the side wall surface 113$a$, and the side wall surface 114$a$, and provided with an opening portion 107 in the remaining direction. The opening portion 107 is formed so as to open in the horizontal direction when the battery module 110 is disposed in the reference attitude.

In addition, between the side wall surface 113$a$ and the side wall surface 114$a$, an internal partition 106 is provided to stand substantially in parallel with the side wall surfaces 113$a$ and 114$a$ so as to partition the discharge path 120 into two spaces. The side lid 103, the upper lid 104, and the lower lid 105 correspond to an example of an external partition.

Each of the cells 100 accommodated in the first block 111 is disposed in an orientation in which the terminal strip 8 side faces the side wall surface 113$a$. In the side wall surface 113$a$, there is provided an opening portion at a position corresponding to the terminal strip 8 of each of the cells 100 disposed to face the side wall surface 113$a$. With the opening portion, the gas released from the release portion 8$a$ is exhausted into the exhaust path 120, and the gas is guided to the opening portion 107 by the exhaust path 120.

Similarly, each of the cells 100 accommodated in the second block 112 is disposed in an orientation in which the terminal strip 8 side faces the side wall surface 114$a$. In the side wall surface 114$a$, there is provided an opening portion at a position corresponding to the terminal strip 8 of each of the cells 100 disposed to face the side wall surface 114$a$. With the opening portion, the gas released from the release portion 8$a$ is exhausted into the exhaust path 120, and the gas is guided to the opening portion 107 by the exhaust path 120.

Thus, the first block 111 and the second block 112 are disposed to face each other, whereby it is possible to reduce the length of the exhaust path 120 extending from each cell 100 to the opening portion 107 as compared with the case where all of the cells 100 are arranged in one line. As a result, a possibility that the temperature of the gas is decreased before the gas released from the cell 100 reaches the temperature fuse 131 is reduced. With the reduction in the possibility of the decrease in the temperature of the gas, the reliability in the detection of the high-temperature gas abnormality by the temperature fuse 131 is improved.

Note that each of the first and second blocks 111 and 112 may be constituted by coupling a plurality of blocks. In addition, the cells 100 may be stacked in a plurality of tiers to be accommodated in the casings 113 and 114.

At this point, by providing the internal partition 106, the high-temperature gas exhausted from the first block 111 is prevented from being blown to the second block 112, and the high-temperature gas exhausted from the second block 112 is prevented from being blown to the first block 111. With this arrangement, the high-temperature gas exhausted from one block is prevented from heating the other block. As a result, a possibility of degradation of the block disposed to face the block having exhausted the gas is reduced.

The temperature fuse 131 is disposed at a position where the temperature fuse 131 is exposed to the gas guided to the opening portion 107 by the exhaust path 120 so as to be placed astride the internal partition 106 to protrude on both sides thereof. The temperature fuse 131 may be provided more inwardly in the exhaust path 120 than the opening portion 107, and may also be provided outside the opening portion 107.

In addition, the temperature fuse 131 is disposed in the uppermost region among regions obtained by trisecting the opening portion 107 in the vertical direction.

The high-temperature gas released from the cell 100 rises in the exhaust path 120, and hence the upper portion in the exhaust path 120 has a temperature higher than that of the lower portion therein. Accordingly, by disposing the temperature fuse 131 in the uppermost region among the regions obtained by trisecting the opening portion 107 in the vertical direction, it is possible to improve the reliability in the detection of the high-temperature gas by the temperature fuse 131.

Note that the position of the temperature fuse 131 is not necessarily limited to the uppermost region among the regions obtained by trisecting the opening portion 107 in the vertical direction. The temperature fuse 131 may also be disposed, e.g., in the vicinity of the lower portion of the opening portion 107.

In addition, the provision of each of the battery module 110 and the high-temperature abnormality detection unit 130 is not limited to the example where a plurality of the battery modules 110 and a plurality of the high-temperature abnormality detection units 130 are provided, and each of the number of provided battery modules 110 and the number of provided high-temperature abnormality detection units 130 may also be one.

That is, a battery system according to one aspect of the present invention includes a battery module that has a plurality of batteries which are provided with release portions each for releasing internal gas when an internal pressure is increased, and an exhaust portion which is provided with an opening portion and guides gas released from the release portions to the opening portion, a non-resettable switch element which is provided at a position where the guided gas passes in a vicinity of the opening portion, and is changed from a first state preset as one of an opened state and a closed state into a second state as the other one of the opened state and the closed state when a preset reference temperature or higher is reached, and a high-temperature abnormality determination unit which determines that the battery module has an abnormality when the switch element is in the second state.

According to the configuration, any one of the plurality of the batteries releases high-temperature gas, the high-temperature gas is guided to the opening portion by the exhaust portion. Subsequently, the switch element provided in the vicinity of the opening portion is changed into the second state. When the switch element is brought into the second state, the high-temperature abnormality determination unit determines that the battery module has the abnormality. Consequently, it is possible to detect the abnormality of the plurality of the batteries by using one switch element, and hence it is possible to simplify a circuit for detecting the abnormality. In addition, since the switch element is non-resettable, once the switch element is brought into the second state, the switch element is maintained in the second state irrespective of the operation state of the high-temperature abnormality determination unit. As a result, even in a case where the abnormality has occurred when an operational power supply voltage is not supplied to the high-temperature abnormality determination unit due to, e.g., the turning off of a higher level system receiving the power supply from the battery system or the like, when the higher level system is turned on or the like and the high-temperature abnormality determination unit thereby becomes operable, the high-temperature abnormality determination unit can determine that the battery module has the abnormality based on that the switch element is maintained in the second state. As a result, it is possible to improve reliability in the detection of release of the gas from the battery.

In addition, the battery module may be provided in plurality, the switch element may be provided in plurality so as to correspond to the battery modules respectively, the battery system may further include a plurality of resistors connected to the switch elements in parallel respectively, a series circuit may be constituted by connecting, in series, a plurality of parallel circuits each constituted by connecting each of the switch elements and each of the resistors in parallel, and the high-temperature abnormality determination unit may determine presence or absence of the abnormality of the battery modules based on a resistance value of the series circuit.

According to the configuration, since the series circuit is constituted by connecting, in series, the plurality of parallel circuits each constituted by connecting each of the switch elements and each of the resistors in parallel, in accordance with the opened or closed state of the switch element, i.e., in accordance with the presence or absence of the abnormality of the battery module, the resistance value of the entire series circuit is changed. Consequently, the high-temperature abnormality determination unit can determine the presence or absence of the abnormality of the battery modules based on the resistance value of the series circuit.

Further, the closed state is preferably set as the first state and the opened state is preferably set as the second state and, when the resistance value of the series circuit exceeds a preset determination value, the high-temperature abnormality determination unit preferably regards at least one of the plurality of the switch elements as in the second state and determines that at least one of the plurality of the battery modules has the abnormality.

According to the configuration, when any of the plurality of the battery modules has the abnormality to release the gas, the switch element corresponding to the battery module having the abnormality is brought into the opened state. Then, when any of the switch elements is brought into the opened state, the resistance value of the entire series circuit is increased. Accordingly, when the resistance value of the series circuit exceeds the determination value, the high-temperature abnormality determination unit can determine that at least one of the plurality of the battery modules has the abnormality.

Furthermore, the opened state may be set as the first state and the closed state may be set as the second state and, when the resistance value of the series circuit is less than a preset determination value, the high-temperature abnormality determination unit may regard at least one of the plurality of the switch elements as in the second state and determine that at least one of the plurality of the battery modules has the abnormality.

According to the configuration, when any of the plurality of the battery modules has the abnormality to release the gas, the switch element corresponding to the battery module having the abnormality is brought into the closed state. When any of the switch elements is brought into the closed state, the resistance value of the entire series circuit is reduced. Accordingly, when the resistance value of the series circuit is less than the determination value, the high-temperature abnormality determination unit can determine that at least one of the plurality of the battery modules has the abnormality.

Moreover, when A represents a constant greater than 0, B represents a common ratio greater than 0 except 1, and n represents a positive integer, a value of each term of a geometrical progression in which the n-th term is represented by the following expression (1) is preferably preset as a resistance value of each of the plurality of the resistors, and the high-temperature abnormality determination unit preferably further identifies the battery module having the abnormality based on the resistance value of the series circuit:

$$A \times B^n \quad (1).$$

According to the configuration, the resistance value of each resistor is set such that, in a case where one or more of the plurality of the resistors are selected and combined, when the combination of the resistors is different, the total value of the resistance values of the combined resistors is different. Consequently, when the state of any switch element included in the series circuit is changed, the value of the combined resistance of the entire series circuit differs. As a result, the high-temperature abnormality determination unit can identify the battery module having the abnormality based on the resistance value of the series circuit.

In addition, the battery module is preferably provided in plurality, the switch element is preferably provided in plurality so as to correspond to the battery modules respectively, a series circuit is preferably constituted by connecting the plurality of the switch elements in series, the closed state is preferably set as the first state and the opened state is preferably set as the second state and, when a resistance value of the series circuit exceeds a preset determination value, the high-temperature abnormality determination unit preferably regards at least one of the plurality of the switch elements as in the second state and determines that at least one of the plurality of the battery modules has the abnormality.

According to the configuration, when any of the plurality of the battery modules has the abnormality to release the gas, the switch element corresponding to the battery module having the abnormality is brought into the opened state. In addition, since the series circuit is constituted by connecting the plurality of the switch elements in series, when any of the switch elements is brought into the opened state, the resistance value of the entire series circuit becomes substantially infinite and exceeds the determination value. Consequently, the high-temperature abnormality determination unit can detect the abnormality of the plurality of the battery modules only by monitoring the resistance value of one series circuit, and hence it becomes possible to monitor the presence or absence of occurrence of the abnormality of the plurality of the battery modules with a simple circuit.

Further, the battery module is preferably provided in plurality, the switch element is preferably provided in plurality so as to correspond to the battery modules respectively, the battery system preferably further includes a plurality of resistors connected to the switch elements in series respectively, a parallel circuit is preferably constituted by connecting, in parallel, a plurality of circuit blocks each constituted by connecting each of the switch elements and each of the resistors in series, and the high-temperature abnormality determination unit preferably determines presence or absence of the abnormality of the battery modules based on a resistance value of the parallel circuit.

According to the configuration, since the parallel circuit is constituted by connecting, in parallel, the plurality of circuit blocks each constituted by connecting each of the switch elements and each of the resistors in series, in accordance with the opened or closed state of the switch element, i.e., in accordance with the presence or absence of the abnormality of the battery module, the resistance value of the entire parallel circuit is changed. Consequently, the high-temperature abnormality determination unit can determine the presence or absence of the abnormality of the battery modules based on the resistance value of the parallel circuit.

Furthermore, the closed state is preferably set as the first state and the opened state is preferably set as the second state and, when the resistance value of the parallel circuit exceeds a preset determination value, the high-temperature abnormality determination unit preferably regards at least one of the plurality of the switch elements as in the second state and determines that at least one of the plurality of the battery modules has the abnormality.

According to the configuration, when any of the plurality of the battery modules has the abnormality to release the gas, the switch element corresponding to the battery module having the abnormality is brought into the opened state. Then, when any of the switch elements is brought into the opened state, the resistance value of the entire parallel circuit is increased. Accordingly, when the resistance value of the parallel circuit exceeds the determination value, the high-temperature abnormality determination unit can determine that at least one of the plurality of the battery modules has the abnormality.

Moreover, the opened state may be set as the first state and the closed state may be set as the second state and, when the resistance value of the parallel circuit is less than a preset determination value, the high-temperature abnormality determination unit may regard at least one of the plurality of the switch elements as in the second state and determine that at least one of the plurality of the battery modules has the abnormality.

According to the configuration, when any of the plurality of the battery modules has the abnormality to release the gas, the switch element corresponding to the battery module having the abnormality is brought into the closed state. When any of the switch elements is brought into the closed state, the resistance value of the entire parallel circuit is reduced. Accordingly, when the resistance value of the parallel circuit is less than the determination value, the high-temperature abnormality determination unit can determine that at least one of the plurality of the battery modules has the abnormality.

In addition, when A represents a constant greater than 0, B represents a common ratio greater than 0 except 1, and n represents a positive integer, a value of each term of a geometrical progression in which the n-th term is represented by the following expression (1) is preferably preset as a resistance value of each of the plurality of the resistors, and the high-temperature abnormality determination unit preferably further identifies the battery module having the abnormality based on the resistance value of the parallel circuit:

$$A \times B^n \qquad (1).$$

According to the configuration, the resistance value of each resistor is set such that, in a case where one or more of the plurality of the resistors are selected and combined, when the combination of the resistors is different, the total value of the resistance values of the combined resistors is different. Consequently, when the state of any switch element included in the parallel circuit is changed, the value of the combined resistance of the entire parallel circuit differs. As a result, the high-temperature abnormality determination unit can identify the battery module having the abnormality based on the resistance value of the parallel circuit.

Further, the battery module is preferably provided in plurality, the switch element is preferably provided in plurality so as to correspond to the battery modules respectively, a parallel circuit is preferably constituted by connecting the plurality of the switch elements in parallel, the opened state is preferably set as the first state and the closed state is preferably set as the second state and, when a resistance value of the parallel circuit is less than a preset determination value, the high-temperature abnormality determination unit preferably regards at least one of the plurality of the switch elements as in the second state and determines that at least one of the plurality of the battery modules has the abnormality.

According to the configuration, when any of the plurality of the battery modules has the abnormality to release the gas, the switch element corresponding to the battery module having the abnormality is brought into the closed state. In addition, since the parallel circuit is constituted by connecting the plurality of the switch elements in parallel, when any of the switch elements is brought into the closed state, the resistance value of the entire parallel circuit becomes substantially 0 ohm and becomes less than the determination value. Consequently, the high-temperature abnormality determination unit can detect the abnormality of the plurality of the battery modules only by monitoring the resistance value of one parallel circuit, and hence it becomes possible to monitor the presence or absence of occurrence of the abnormality of the plurality of the battery modules with a simple circuit.

Furthermore, the opening portion of each of the plurality of the battery modules preferably opens in a horizontal direction, and each of the switch elements is preferably disposed in an uppermost region among regions obtained by trisecting the opening portion in a vertical direction.

The high-temperature gas released from the batteries rises upwardly so that the temperature of the gas guided to the opening portion is higher in the vicinity of the upper portion of the opening portion than in the vicinity of the lower portion thereof. Accordingly, by disposing the switch element in the uppermost region among the regions obtained by trisecting the opening portion in the vertical direction, it is possible to improve the reliability in the detection of the high-temperature gas by the switch element.

Moreover, each of the battery modules preferably includes a first block including a plurality of the batteries disposed such that the gas is released to an identical side, and a second block including a plurality of the batteries disposed such that the gas is released to an identical side, each of the first blocks and each of the second blocks are preferably disposed to face each other such that release directions of the gas face each other, and preferably form a passage space for guiding the gas to the opening portion between each of the first blocks and each of the second blocks, and each of the exhaust portions has an external partition which separates each of the passage spaces from an external space except each of the opening portions.

According to the configuration, by disposing the first block and the second block such that the first block and the second block face each other, it is possible to reduce the length of the exhaust path extending from the battery to the opening portion as compared with a case where all of the batteries are arranged in one line. As a result, a possibility that the temperature of the gas is decreased before the gas released from the battery reaches the switch element is reduced. Accordingly, with the reduction in the possibility of the decrease in the temperature of the gas, the reliability in the detection of the high-temperature gas abnormality by the switch element is improved.

In addition, each of the exhaust portions preferably further has an internal partition which partitions each of the passage spaces into two spaces between each of the first blocks and each of the second blocks, each of the internal partitions is preferably disposed so as to halve each of the opening portions, and each of the switch elements is preferably disposed so as to be placed astride each of the internal partitions to protrude on both sides of each of the internal partitions.

According to the configuration, by providing the internal partition, the high-temperature gas exhausted from the first block is prevented from being blown to the second block, and the high-temperature gas exhausted from the second block is prevented from being blown to the first block. With this arrangement, the high-temperature gas exhausted from one block is prevented from heating the other block. As a result, a possibility of degradation of the block disposed to face the block having exhausted the gas is reduced.

In the battery system according to one aspect of the present invention, it is easy to immediately determine that an abnormality occurs in a lithium ion battery when high-temperature gas is generated from the lithium ion battery, and to determine that the abnormality has occurred in the lithium ion battery before the start of the battery system.

This application is based on Japanese Patent Application No. 2010-171639 filed on Jul. 30, 2010, and the contents of which are hereby incorporated by reference.

Note that the specific embodiment or example given in Description of Embodiments is intended only to clarify the technical contents of the present invention. The present invention should not be construed in a narrow sense as being limited to the specific example.

INDUSTRIAL APPLICABILITY

The present invention is useful as a power supply for driving a car, an electric motorcycle, or an electric toy, or the like.

The invention claimed is:

1. A battery system comprising:
a battery module that has a plurality of batteries which are provided with release portions each for releasing internal gas when an internal pressure is increased, and an exhaust portion which is provided with an opening portion and guides gas released from the release portions to the opening portion;
a non-resettable switch element which is provided at a position where the guided gas passes in a vicinity of the opening portion, and is changed from a first state preset as one of an opened state and a closed state into a second state as the other one of the opened state and the closed state when a preset reference temperature or higher is reached;
a high-temperature abnormality determination circuit which determines that the battery module has an abnormality when the switch element is in the second state; and
a power supply which is provided separately from the battery module and outputs a voltage for causing the high-temperature abnormality determination circuit to operate, wherein:
once the non-resettable switch element is brought into the second state, the non resettable switch element is not returned to the first state but maintained in the second state, irrespective of an operation state of the high-temperature abnormality determination circuit, and
when the high-temperature abnormality determination circuit starts to operate by the voltage output from the power supply, the high-temperature abnormality determination circuit determines that the abnormality has occurred in the battery module before starting the operation of the high-temperature abnormality determination circuit, in a case where the non-resettable switch element is maintained in the second state.

2. The battery system according to claim 1, wherein:
the battery module is provided in plural,
the switch element is provided in plural so as to correspond to the battery modules respectively,
the battery system further comprises a plurality of resistors connected to the switch elements in parallel respectively,
a series circuit is constituted by connecting, in series, a plurality of parallel circuits each constituted by connecting each of the switch elements and each of the resistors in parallel, and
the high-temperature abnormality determination circuit determines presence or absence of the abnormality of the battery modules based on a resistance value of the series circuit.

3. The battery system according to claim 2, wherein:
the closed state is set as the first state and the opened state is set as the second state, and
when the resistance value of the series circuit exceeds a preset determination value, the high-temperature abnormality determination circuit regards at least one of the plurality of the switch elements as in the second state and determines that at least one of the plurality of the battery modules has the abnormality.

4. The battery system according to claim 2, wherein:
the opened state is set as the first state and the closed state is set as the second state, and
when the resistance value of the series circuit is less than a preset determination value, the high-temperature abnormality determination circuit regards at least one of the plurality of the switch elements as in the second state and determines that at least one of the plurality of the battery modules has the abnormality.

5. The battery system according to claim 2, wherein:
when A represents a constant greater than 0, B represents a common ratio greater than 0 except 1, and n represents a positive integer, a value of each term of a geometrical progression in which the n-th term is represented by the following expression (1) is preset as a resistance value of each of the plurality of the resistors, and
the high-temperature abnormality determination circuit further identifies the battery module having the abnormality based on the resistance value of the series circuit:

$$A \times B^n \qquad (1).$$

6. The battery system according to claim 1, wherein:
the battery module is provided in plural,
the switch element is provided in plural so as to correspond to the battery modules respectively,
a series circuit is constituted by connecting the plurality of the switch elements in series,
the closed state is set as the first state and the opened state is set as the second state, and
when a resistance value of the series circuit exceeds a preset determination value, the high-temperature abnormality determination circuit regards at least one of the plurality of the switch elements as in the second state and determines that at least one of the plurality of the battery modules has the abnormality.

7. The battery system according to claim 1, wherein:
the battery module is provided in plural,
the switch element is provided in plural so as to correspond to the battery modules respectively,
the battery system further comprises a plurality of resistors connected to the switch elements in series respectively,
a parallel circuit is constituted by connecting, in parallel, a plurality of circuit blocks each constituted by connecting each of the switch elements and each of the resistors in series, and the high-temperature abnormality determination circuit determines presence or absence of the abnormality of the battery modules based on a resistance value of the parallel circuit.

8. The battery system according to claim 7, wherein:
the closed state is set as the first state and the opened state is set as the second state, and
when the resistance value of the parallel circuit exceeds a preset determination value, the high-temperature abnormality determination circuit regards at least one of the plurality of the switch elements as in the second state and determines that at least one of the plurality of the battery modules has the abnormality.

9. The battery system according to claim 7, wherein:
the opened state is set as the first state and the closed state is set as the second state, and
when the resistance value of the parallel circuit is less than a preset determination value, the high-temperature abnormality determination circuit regards at least one of the plurality of the switch elements as in the second state and determines that at least one of the plurality of the battery modules has the abnormality.

10. The battery system according to claim 7, wherein:
when A represents a constant greater than 0, B represents a common ratio greater than 0 except 1, and n represents a positive integer, a value of each term of a geometrical progression in which the n-th term is represented by the following expression (1) is preset as a resistance value of each of the plurality of the resistors, and
the high-temperature abnormality determination circuit further identifies the battery module having the abnormality based on the resistance value of the parallel circuit:

$$A \times B^n \quad (1).$$

11. The battery system according to claim 1, wherein:
the battery module is provided in plural,
the switch element is provided in plural so as to correspond to the battery modules respectively,
a parallel circuit is constituted by connecting the plurality of the switch elements in parallel,
the opened state is set as the first state and the closed state is set as the second state, and
when a resistance value of the parallel circuit is less than a preset determination value, the high-temperature abnormality determination circuit regards at least one of the plurality of the switch elements as in the second state and determines that at least one of the plurality of the battery modules has the abnormality.

12. The battery system according to claim 2, wherein:
the opening portion of each of the plurality of the battery modules opens in a horizontal direction, and
each of the switch elements is disposed in an uppermost region among regions obtained by trisecting the opening portion in a vertical direction.

13. The battery system according to claim 2, wherein:
each of the battery modules includes a first block including a plurality of the batteries disposed such that the gas is released to an identical side, and a second block including a plurality of the batteries disposed such that the gas is released to an identical side,
each of the first blocks and each of the second blocks are disposed to face each other such that release directions of the gas face each other, and form a passage space for guiding the gas to the opening portion between each of the first blocks and each of the second blocks, and
each of the exhaust portions has an external partition which separates each of the passage spaces from an external space except each of the opening portions.

14. The battery system according to claim 13, wherein:
each of the exhaust portions further has an internal partition which partitions each of the passage spaces into two spaces between each of the first blocks and each of the second blocks,
each of the internal partitions is disposed so as to halve each of the opening portions, and
each of the switch elements is disposed so as to be placed astride each of the internal partitions to protrude on both sides of each of the internal partitions.

* * * * *